(12) United States Patent
Ohmura et al.

(10) Patent No.: US 9,487,232 B2
(45) Date of Patent: Nov. 8, 2016

(54) VEHICLE TURNING CONTROL SYSTEM

(71) Applicant: HONDA MOTOR CO., LTD., Minato-Ku, Tokyo (JP)

(72) Inventors: Kazutaka Ohmura, Wako (JP); Takeshi Kojima, Wako (JP); Tomoyuki Futamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/574,825

(22) Filed: Dec. 18, 2014

(65) Prior Publication Data

US 2015/0175196 A1    Jun. 25, 2015

(30) Foreign Application Priority Data

Dec. 24, 2013    (JP) .................................. 2013-265129

(51) Int. Cl.
    *B62D 6/00*        (2006.01)
    *B60T 8/1755*      (2006.01)

(52) U.S. Cl.
    CPC ............. *B62D 6/003* (2013.01); *B60T 8/1755* (2013.01); *B60T 2270/303* (2013.01)

(58) Field of Classification Search
    CPC .... B62D 60/003; B62D 6/00; B60W 40/114; B60T 8/1755; B60T 2270/303; G05D 1/00
    USPC .............. 701/41, 42; 180/422, 424; 340/439
    See application file for complete search history.

(56) References Cited

U.S. PATENT DOCUMENTS

| | | | | |
|---|---|---|---|---|
| 4,834,205 A | * | 5/1989 | Mizuno | B62D 7/159 180/422 |
| 5,869,943 A | * | 2/1999 | Nakashima | B60T 8/17554 303/146 |
| 6,074,020 A | * | 6/2000 | Takahashi | B60T 8/1755 303/146 |
| 6,813,552 B2 | * | 11/2004 | Ghoneim | B60T 8/17555 180/333 |
| 6,819,998 B2 | * | 11/2004 | Lin | B62D 6/04 701/69 |
| 2003/0078712 A1 | * | 4/2003 | Shimakage | B62D 1/286 701/41 |
| 2005/0288834 A1 | * | 12/2005 | Heiniger | G05D 1/027 701/23 |

(Continued)

FOREIGN PATENT DOCUMENTS

| | | |
|---|---|---|
| JP | 2004168296 A | 6/2004 |
| JP | 2004175353 A | 6/2004 |

(Continued)

OTHER PUBLICATIONS

Office Action dispatched Oct. 27, 2015 in corresponding Japanese Patent Application No. 2013-265129.

*Primary Examiner* — Shardul Patel

(74) *Attorney, Agent, or Firm* — Carrier Blackman & Associates, P.C.; William D. Blackman; Jingli Wang

(57) ABSTRACT

An object of the present invention is to provide a vehicle turning control system capable of maintaining stability of a vehicle, even in a case where a mode of output characteristics of a power plant for the vehicle is switched by a driver's operation. In a running mode in which output characteristics of an engine is higher, the vehicle turning control system increases a control gain of a feedforward control unit for performing yaw moment control of the vehicle by feedforward control, and decreases a control gain of a feedback control unit for performing yaw moment control of the vehicle by feedback control. A control gain of vehicle behavior stabilization control performed by the vehicle behavior stabilization control unit is controlled commonly regardless of the running mode.

17 Claims, 5 Drawing Sheets

(56) References Cited

U.S. PATENT DOCUMENTS

| | | | |
|---|---|---|---|
| 2007/0145819 A1* | 6/2007 | Lin | B60T 8/172 303/146 |
| 2007/0290857 A1* | 12/2007 | Li | G08B 13/2408 340/572.6 |
| 2009/0118905 A1* | 5/2009 | Takenaka | B60T 8/17552 701/41 |
| 2010/0023217 A1* | 1/2010 | Horiuchi | B62D 7/159 701/42 |
| 2010/0030430 A1* | 2/2010 | Hayakawa | B60T 8/17557 701/42 |
| 2010/0191423 A1* | 7/2010 | Koyama | B60W 30/09 701/42 |
| 2010/0228465 A1* | 9/2010 | Itabashi | F02D 41/021 701/104 |
| 2013/0006476 A1* | 1/2013 | Yamazaki | B60T 8/1755 701/42 |

FOREIGN PATENT DOCUMENTS

| | | |
|---|---|---|
| JP | 2005-153716 A | 6/2005 |
| JP | 2013-071549 A | 4/2013 |

* cited by examiner

VEHICLE TURNING CONTROL SYSTEM

CROSS REFERENCE TO RELATED APPLICATIONS

This application claims the foreign priority benefit under Title 35, United States Code, 119 (a)-(d) of Japanese Patent Application No. 2013-265129 filed on Dec. 24, 2013 in the Japan Patent Office, the disclosure of which is herein incorporated by reference in its entirety.

TECHNICAL FIELD

The present invention relates to a vehicle turning control system.

BACKGROUND ART

Patent Document 1 discloses a vehicle behavior stabilization control to stabilize a vehicle behavior by applying a braking force individually to each of four wheels of a vehicle. In addition, as described in Patent Document 2, there is also known a technique of performing vehicle turning control by controlling a yaw moment. Patent Document 2 discloses a technique of performing feedback control and feedforward control for the yaw moment of the vehicle in accordance with a steering angle of the vehicle, or the like.

CITATION LIST

Patent Literature

{Patent Document 1}
Japanese Patent Application Publication No. 2013-071549
{Patent Document 2}
Japanese Patent Application Publication No. 2005-153716

SUMMARY OF INVENTION

Technical Problem

A mode of output characteristics of a power plant for the vehicle is sometimes switched to a plurality of modes step by step by a driver's operation (for example, to select modes to determine whether a revolution of the power plant is switched to a normal revolution or to a higher revolution). In the vehicle having such a plurality of modes, when performing the vehicle behavior stabilization control, it is considered that contents of the vehicle behavior stabilization control is varied in accordance with a concept of each of the modes. However, if the contents of the vehicle behavior stabilization control is varied in this manner (in particular, if it is varied so as to decrease stability of the vehicle behavior), there is a possibility that the stability of the vehicle is impaired. This is because the vehicle behavior stabilization control is a control to stabilize the vehicle behavior by a relatively strong braking force in a vicinity of a limit where the behavior of the vehicle is likely to be disturbed. Therefore, an object of the present invention is to provide a vehicle turning control system capable of maintaining the stability of the vehicle, even in a case where the mode of output characteristics of the power plant for the vehicle is switched by the driver's operation.

Solution to Problem

One embodiment of the present invention is a vehicle turning control system including a yaw moment control unit for performing yaw moment control of a vehicle in accordance with a steering amount of the vehicle, and a switching unit for switching output characteristics of a power plant for the vehicle to a plurality of modes by a driver's operation, wherein the yaw moment control unit changes a control gain of the yaw moment control in accordance with which of the plurality of modes is selected. According to the present invention, the control gain of the yaw moment control is varied in accordance with the mode. That is, the control gain is varied in accordance with the mode not by the vehicle behavior stabilization control but by the yaw moment control. Therefore, the stability of the vehicle can be maintained even in a case where the control gain is varied.

In the case described above, the yaw moment control unit may include a feedforward control unit for performing yaw moment control of the vehicle by feedforward control in accordance with the steering amount of the vehicle, and the feedforward control unit may increase a control gain of the feedforward control in a mode where the output characteristics of the power plant is higher than that of other modes among the plurality of modes. According to the present invention, as the mode becomes high in the output characteristics of the power plant, the yaw moment control unit controls the control gain of the feedforward control to be increased. Therefore, a response of the control is improved, and it is possible to travel with an emphasis on vehicle controllability by the driver in a case where the output characteristics of the power plant is increased by the driver's intention.

In the case described above, the yaw moment control unit may include a feedback control unit for performing yaw moment control of the vehicle by feedback control in accordance with the steering amount of the vehicle, and the feedback control unit may decrease a control gain of the feedback control in a mode where the output characteristics of the power plant is higher than that of other modes among the plurality of modes. According to the present invention, as the mode becomes high in the output characteristics of the power plant, the yaw moment control unit controls the control gain of the feedback control to be decreased. Therefore, the response of the control is improved, and it is possible to travel with the emphasis on vehicle controllability by the driver in the case where the output characteristics of the power plant is increased by the driver's intention.

In these cases, the switching unit may include, as the plurality of modes, a first mode, a second mode, and a third mode, in which the output characteristics of the power plant for the vehicle is increased in this order, and the feedforward control unit may increase the control gain in the order of the first mode, the second mode, and the third mode. Or, the switching unit may include, as the plurality of modes, a first mode, a second mode, and a third mode, in which the output characteristics of the power plant for the vehicle is increased in this order, and the feedback control unit may decrease the control gain in the order of the first mode, the second mode, and the third mode. According to the present invention, in a case where the output characteristics of the power plant is increased by switching the modes by the driver's intention, it is possible to travel with the emphasis on vehicle controllability by the driver.

Further, in the case described above, the vehicle turning control system may further include a vehicle behavior stabilization control unit for performing a control to stabilize the vehicle behavior based on a difference between an actual yaw rate of the vehicle and a target yaw rate of the vehicle after the feedforward control, and the vehicle behavior stabilization control unit may change the control gain commonly regardless of the mode. Or, the vehicle turning control system may further include a vehicle behavior stabilization control unit for performing a control to stabilize the vehicle behavior based on a difference between an actual yaw rate of the vehicle and a target yaw rate of the vehicle after the feedback control, and the vehicle behavior stabilization control unit may change the control gain commonly regardless of the mode. According to the present invention, since the control gain in the vehicle behavior stabilization control unit changes commonly regardless of a difference in mode, it is possible to maintain the stability of the vehicle.

In the case described above, in the vehicle behavior stabilization control unit, a change of control gain of a vehicle behavior stabilization control between a time of transition to the vehicle behavior stabilization control from the yaw moment control by the feedback control of the first mode and a time of transition to the vehicle behavior stabilization control from the yaw moment control by the feedback control of the second mode, may be slower than a change of control gain of the vehicle behavior stabilization control between a time of transition to the vehicle behavior stabilization control from the yaw moment control by the feedback control of the second mode and a time of transition to the vehicle behavior stabilization control from the yaw moment control by the feedback control of the third mode. According to the present invention, in a case of traveling with the emphasis on vehicle controllability by the driver, since a forced operation of the braking force by the vehicle behavior stabilization control starts slowly, an uncomfortable feeling is not given to the driver.

In the case described above, the braking force by the feedforward control unit may be smaller than the braking force by the vehicle behavior stabilization control unit. Or, the braking force by the feedback control unit may be smaller than the braking force by the vehicle behavior stabilization control unit. According to the present invention, since the vehicle behavior stabilization control unit, which stabilizes the vehicle behavior by a strong braking force, changes the control gain commonly regardless of the mode, it is possible to maintain the stability of the vehicle.

Advantageous Effects of Invention

According to the present invention, it is possible to provide a vehicle turning control system capable of maintaining the stability of the vehicle, even in a case where the mode of output characteristics of the power plant for the vehicle is switched by the driver's operation.

DESCRIPTION OF EMBODIMENTS

Figure 1:
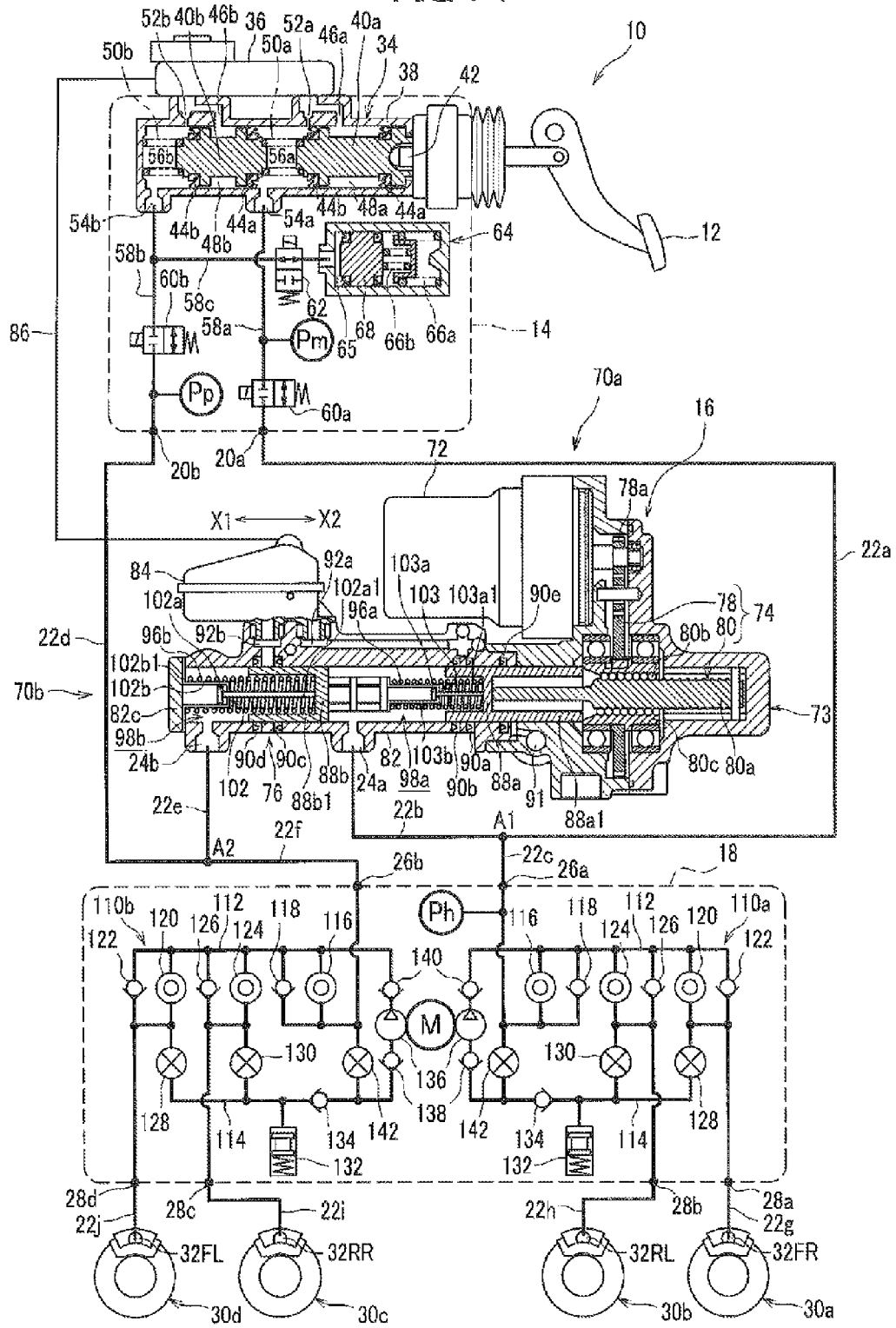
FIG. 1 is a schematic diagram of a vehicle brake system according to an embodiment of the present invention.

In the followings, an embodiment of the present invention will be described. FIG. 1 is a schematic diagram of a vehicle brake system 10 according to an embodiment of the present invention. The vehicle brake system 10 is mounted on a vehicle (vehicle 300 in FIG. 3). First, hydraulic pressure passages will be described. With reference to a connection point A1 in FIG. 1, the connection point A1 and a connection port 20a of an input device 14 are connected with a first pipe tube 22a, and the connection point A1 and an output port 24a of a motor cylinder device 16 are connected with a second pipe tube 22b, and further the connection point A1 and an input port 26a of a vehicle behavior stabilization device 18 are connected with a third pipe tube 22c.

With reference to the other connection point A2 in FIG. 1, the connection point A2 and the other connection port 20b of the input device 14 are connected with a fourth pipe tube 22d, and the connection point A2 and the other output port 24b of the motor cylinder device 16 are connected with a fifth pipe tube 22e, and further the connection point A2 and the other input port 26b of the vehicle behavior stabilization device 18 are connected with a sixth pipe tube 22f.

The vehicle behavior stabilization device 18 is provided with a plurality of output ports 28a to 28d. A first output port 28a is connected to a wheel cylinder 32FR of a disk brake mechanism 30a provided on a front right wheel (not shown in FIG. 1) of the vehicle with a seventh pipe tube 22g. A second output port 28b is connected to a wheel cylinder 32RL of a disk brake mechanism 30b provided on a rear left wheel (not shown in FIG. 1) with an eighth pipe tube 22h. A third output port 28c is connected to a wheel cylinder 32RR of a disk brake mechanism 30c provided on a rear right wheel (not shown in FIG. 1) with a ninth pipe tube 22i. A fourth output port 28d is connected to a wheel cylinder 32FL of a disk brake mechanism 30d provided on a front left wheel (not shown in FIG. 1) with a tenth pipe tube 22j.

In this case, a brake fluid is supplied to each of the wheel cylinders 32FR, 32RL, 32RR, and 32FL of the disk brake mechanisms 30a to 30d through the pipe tubes 22g to 22j connected to each of the output ports 28a to 28d. Since hydraulic pressure in each of the wheel cylinders 32FR, 32RL, 32RR, and 32FL is increased, each of the wheel cylinders 32FR, 32RL, 32RR, and 32FL is operated to apply a friction braking force to each of the corresponding wheels (front right wheel, rear left wheel, rear right wheel, front left wheel).

The input device 14 includes a tandem master cylinder 34 capable of generating hydraulic pressure by operation of a brake pedal 12 by a driver, and a first reservoir 36 attached to the master cylinder 34. In a cylinder tube 38 of the master cylinder 34, a first piston 40b and a second piston 40a, which are separated from each other by a predetermined distance in an axial direction of the cylinder tube 38, are slidably arranged. The second piston 40a is disposed in close proximity to the brake pedal 12 and coupled to the brake pedal 12 via a push rod 42. Further, the first piston 40b is disposed away from the brake pedal 12 compared to the second piston 40a.

On outer peripheral surfaces of the first piston 40b and the second piston 40a, pairs of cup seals 44a, 44b are respectively mounted via annular step portions. Between the pairs of cup seals 44a, 44b, back chambers 48a, 48b respectively communicating with supply ports 46a, 46b to be described later, are formed. Further, a spring member 50a is disposed between the first piston 40b and the second piston 40a, and the other spring member 50b is disposed between the first piston 40b and a front end portion of the cylinder tube 38.

The cylinder tube 38 of the master cylinder 34 is provided with the two supply ports 46a, 46b, two relief ports 52a, 52b, and two output ports 54a, 54b. In this case, each of the supply ports 46a, 46b and each of the relief ports 52a, 52b are provided so as to respectively join to communicate with a reservoir chamber (not shown) in the first reservoir 36.

Further, in the cylinder tube 38 of the master cylinder 34, a first pressure chamber 56b and a second pressure chamber 56a, which generate a brake hydraulic pressure in accordance with a depression force of the brake pedal 12 depressed by the driver, are provided. The second pressure chamber 56a is provided to communicate with the connection port 20a via a second hydraulic pressure passage 58a, and the first pressure chamber 56b is provided to communicate with the other connection port 20b via a first hydraulic pressure passage 58b.

Between the master cylinder 34 and the connection port 20a, a pressure sensor Pm is provided on an upstream side of the second hydraulic pressure passage 58a, while a second shutoff valve 60a made of a normally open type solenoid valve is provided on a downstream side of the second hydraulic pressure passage 58a. The pressure sensor Pm is adapted to detect a hydraulic pressure on the upstream side closer to the master cylinder 34 than the second shutoff valve 60a on the second hydraulic pressure passage 58a.

Between the master cylinder 34 and the other connection port 20b, a first shutoff valve 60b made of a normally open type solenoid valve is provided on an upstream side of the first hydraulic pressure passage 58b, while a pressure sensor Pp is provided on a downstream side of the first hydraulic pressure passage 58b. The pressure sensor Pp is adapted to detect a hydraulic pressure on the downstream side closer to the wheel cylinders 32FR, 32RL, 32RR, and 32FL than the first shutoff valve 60b on the first hydraulic pressure passage 58b. "Normally open" in the first shutoff valve 60b and the second shutoff valve 60a means that a normal position (position of a valving element when not magnetized (not energized)) is in a state of open position (normally open). In FIG. 1, the first shutoff valve 60b and the second shutoff valve 60a show states when magnetized (a third shutoff valve 62 to be described later is also the same).

On the first hydraulic pressure passage 58b between the master cylinder 34 and the first shutoff valve 60b, a branch hydraulic pressure passage 58c branching from the first hydraulic pressure passage 58b is provided, and to the branch hydraulic pressure passage 58c, a third shutoff valve 62 made of a normally closed type solenoid valve and the stroke simulator 64 are connected in series. "Normally closed" in the third shutoff valve 62 means that a normal position (position of a valving element when not magnetized (not energized)) is in a state of closed position (normally closed). The stroke simulator 64 is disposed on the first hydraulic pressure passage 58b and on the master cylinder 34 side of the first shutoff valve 60b. The stroke simulator 64 is provided with a hydraulic pressure chamber 65 communicating with the branch hydraulic pressure passage 58c, and is capable of absorbing the brake fluid, which is derived from the first pressure chamber 56b of the master cylinder 34, via the hydraulic pressure chamber 65.

Further, the stroke simulator 64 includes a first return spring 66a having a high spring constant and a second return spring 66b having a low spring constant which are arranged in series with each other, and the simulator piston 68 which is urged by the first and second return springs 66a, 66b. The stroke simulator 64 is provided so that an operation feeling of the brake pedal 12 is equivalent to existing master cylinders by setting an increasing gradient of a pedal reaction force low in an early period (first half) of depression of the brake pedal 12, and by setting the pedal reaction force high in a late period (second half) of depression of the brake pedal 12. The hydraulic pressure passages are roughly composed of a second hydraulic system 70a which connects the second pressure chamber 56a of the master cylinder 34 to a plurality of wheel cylinders 32FR, 32RL, and a first hydraulic system 70b which connects the first pressure chamber 56b of the master cylinder 34 to a plurality of wheel cylinders 32RR, 32FL.

The second hydraulic system 70a is composed of the second hydraulic pressure passage 58a which connects the output port 54a of the master cylinder 34 (cylinder tube 38) to the connection port 20a in the input device 14, the pipe tubes 22a, 22b which connect the connection port 20a of the input device 14 to the output port 24a of the motor cylinder device 16, the pipe tube 22b, 22c which connect the output port 24a of the motor cylinder device 16 to the input port 26a of the vehicle behavior stabilization device 18, and the pipe tubes 22g, 22h which respectively connect the output ports 28a, 28b of the vehicle behavior stabilization device 18 to the wheel cylinders 32FR, 32RL.

The first hydraulic system 70b has the first hydraulic pressure passage 58b which connects the output port 54b of the master cylinder 34 (cylinder tube 38) to the other connection port 20b in the input device 14, the pipe tubes 22d, 22e which connect the other connection port 20b of the input device 14 to the output port 24b of the motor cylinder device 16, the pipe tube 22e, 22f which connect the output port 24b of the motor cylinder device 16 to the input port 26b of the vehicle behavior stabilization device 18, and the pipe tubes 22i, 22j which respectively connect the output ports 28c, 28d of the vehicle behavior stabilization device 18 to the wheel cylinders 32RR, 32FL.

The motor cylinder device 16 is an electric brake device for generating the brake hydraulic pressure by axially driving a first slave piston 88b and a second slave piston 88a by a driving force of an electric motor 72. Note that, in the motor cylinder device 16, a moving direction (direction of an arrow X1 in FIG. 1) of the first slave piston 88b and the second slave piston 88a when the brake hydraulic pressure is generated (increased) is defined as "front", and the opposite direction (direction of an arrow X2 in FIG. 1) is defined as "rear".

The motor cylinder device 16 includes a cylinder portion 76 for accommodating the first slave piston 88b and the second slave piston 88a which are movable in the axial direction, the motor 72 for driving the first slave piston 88b and the second slave piston 88a, and a driving force transmission unit 73 for transmitting the driving force of the motor 72 to the first slave piston 88b and the second slave piston 88a.

Further, the second slave piston 88a is integrally formed with a second cylindrical member 88a1 which is fixed in the front and rear direction of the second slave piston 88a along an outer periphery thereof. The second slave piston 88a is driven in the front and rear direction by sliding the second cylindrical member 88a1 inside the cylinder portion 76. The first slave piston 88b is also integrally formed with a first cylindrical member 88b1 which is fixed in the front and rear direction of the first slave piston 88b along an outer periphery thereof. The first slave piston 88b is driven in the front and rear direction by sliding the first cylindrical member 88b1 inside the cylinder portion 76. The driving force transmission unit 73 has a driving force transmission mechanism 74 which includes a gear mechanism (deceleration mechanism) 78 for transmitting a rotational driving force of the motor 72 and a ball screw structure 80 for converting the rotational driving force to a linear direction driving force of a ball screw shaft 80a.

The cylinder portion 76 has a substantially cylindrical cylinder body 82 and a second reservoir 84 attached to the cylinder body 82. The second reservoir 84 is connected to the first reservoir 36 attached to the master cylinder 34 of the input device 14 with a pipe tube 86, and is provided so that the brake fluid reserved in the first reservoir 36 is supplied into the second reservoir 84 via the pipe tube 86.

As described above, in the cylinder body 82, the first slave piston 88b and the second slave piston 88a, which are spaced from each other by a predetermined distance in the axial direction of the cylinder body 82, are provided to be capable of driving. The second slave piston 88a is disposed in close proximity to the ball screw structure 80 side, and comes into contact with a front end of the ball screw shaft 80a to be displaced integrally with the ball screw shaft 80a in the direction of the arrow X1 or the arrow X2. The first slave piston 88b is disposed far away from the ball screw structure 80 compared to the second slave piston 88a.

A slave cup seal 90a (seal member), which liquid-tightly seals a gap between the driving transmission mechanism 74 and an outer peripheral surface of the second cylindrical member 88a1 fixed to the second slave piston 88a, is provided on the cylinder portion 76 side. A slave cup seal 90b (seal member) is also provided on the cylinder portion 76 side apart from the slave cup seal 90a, and between the slave cup seal 90a and the slave cup seal 90b, a flow passage port communicating with a reservoir port 92a to be described later is provided. Between the first slave piston 88b and the second slave piston 88a, a second return spring 96a is provided. Further, on the other side of the slave cup seal 90b with reference to the slave cup seal 90a, a slave cup seal 90e (seal member) and a liquid reservoir 91 are provided on the cylinder portion 76 side. By providing the slave cup seal 90e and the liquid reservoir 91, the above-described gap is sealed more liquid-tightly. On the other hand, a slave cup seal 90c (seal member), which liquid-tightly seals a gap between a first hydraulic pressure chamber 98b to be described later and an outer peripheral surface of the first cylindrical member 88b1 fixed to the first slave piston 88b, is provided on the cylinder portion 76 side. Further, by the slave cup seal 90b and the slave cup seal 90c, a second hydraulic pressure chamber 98a to be described later is liquid-tightly sealed.

In addition, a slave cup seal 90d (seal member) for liquid-tightly sealing the first hydraulic pressure chamber 98b is provided on the cylinder portion 76 side apart from the slave cup seal 90c. Further, between the slave cup seal 90c and the slave cup seal 90d, a flow passage port communicating with a reservoir port 92b to be described later is provided. And, between the first slave piston 88b and a lid member 82c for closing an opening of the cylinder body 82 (that is, an opening provided on a front end of the cylinder portion 76), a first return spring 96b is provided.

The cylinder body 82 of the cylinder portion 76 is provided with the two reservoir ports 92a, 92b and the two output ports 24a, 24b. In this case, the reservoir ports 92a, 92b are provided to be in communication with a reservoir chamber in the second reservoir 84. In addition, a second hydraulic pressure chamber 98a and a first hydraulic pressure chamber 98b are provided in the cylinder body 82. The second hydraulic pressure chamber 98a generates the brake hydraulic pressure which is outputted from the output port 24a to the side of the wheel cylinders 32FR, 32RL, and the first hydraulic pressure chamber 98b generates the brake hydraulic pressure which is outputted from the other output port 24b to the side of the wheel cylinders 32RR, 32FL.

Further, between the first slave piston 88b and the lid member 82c for closing the opening of the cylinder portion 76, a regulating unit 102 for regulating a sliding range of the first slave piston 88b is provided. By the regulating unit 102, the first slave piston 88b is prevented from over return to the second slave piston 88a side, and especially during backup time of braking with a brake hydraulic pressure generated in the master cylinder 34, when one system fails, a failure in the other system is prevented. Further, between the first slave piston 88b and the second slave piston 88a, a regulating unit 103 for regulating the minimum separation distance and the maximum separation distance between the first slave piston 88b and the second slave piston 88a is provided.

The regulating unit 102 is composed of a cylindrical member 102b which is fixed via a flange portion 102b1 between the cylinder body 82 and the lid member 82c, and a first regulating piston 102a which slides inside the cylindrical member 102b and is connected to the first slave piston 88b with a connection member 102a1. That is, the flange portion 102b1 constituting the regulating unit 102 is fixed to be sandwiched between the cylinder body 82 (that is, the cylinder portion 76) and the lid member 82c by screwing or the like (not shown). Then, by sliding the first piston 102a in the cylindrical member 102b, the sliding range of the first slave piston 88b connected to the first regulating piston 102a is regulated.

Further, the regulating unit 103 is composed of a cylindrical member 103b which is fixed to be connected to the first slave piston 88b, and a second regulating piston 103a which slides inside the cylindrical member 103b and is connected to the second slave piston 88a with a connection member 103a1. Then, by sliding the second piston 103a in the cylindrical member 103b, a sliding range of the second slave piston 88a connected to the second regulating piston 103a is regulated.

The vehicle behavior stabilization device 18 includes a second brake system 110a for controlling the second hydraulic system 70a which is connected to disc brake mechanisms 30a, 30b (the wheel cylinders 32FR, 32RL) of the front right wheel and the rear left wheel, and a first brake system 110b for controlling the first hydraulic system 70b which is connected to disc brake mechanisms 30c, 30d (the wheel cylinders 32RR, 32FL) of the rear right wheel and the front left wheel.

Note that, a combination of connections of the second brake system 110a and the first brake system 110b with each of the disc brake mechanisms 30a, 30b, 30c, 30d is not limited to a combination described above, and combinations such as the following can be adopted if it is secured that the two systems are independent from each other. That is, although not shown, the second brake system 110a may be a hydraulic system connected to the disc brake mechanisms provided on the front left wheel 2aL and the front right wheel 2aR, and the first brake system 110b may be a hydraulic system connected to the disc brake mechanisms provided on the rear right wheel and the rear left wheel. Further, the second brake system 110a may be a hydraulic system connected to the disc brake mechanisms provided on the front right wheel and the rear right wheel on one side of the vehicle body, and the first brake system 110b may be a hydraulic system connected to the disc brake mechanisms provided on the front left wheel and the rear left wheel on the other side of the vehicle body. Further, the second brake system 110a may be a hydraulic system connected to the disc brake mechanisms provided on the front right wheel and the front left wheel, and the first brake system 110b may be a hydraulic system connected to the disc brake mechanisms provided on the rear right wheel 2bR and the rear left wheel 2bL. Since the second brake system 110a and the first brake system 110b have the same structures with each other, those corresponding to each other in the second brake system 110a and in the first brake system 110b are denoted by the same reference numerals, while descriptions will be focused on the second brake system 110a, and descriptions of the first brake system 110b will be appropriately appended in parentheses.

The second brake system 110a (the first brake system 110b) has a first common hydraulic pressure passage 112 and a second common hydraulic pressure passage 114, which are common to the wheel cylinders 32FR, 32RL (32RR, 32FL). The vehicle behavior stabilization device 18 includes a regulator valve 116, a first check valve 118, a first inlet valve 120, a second check valve 122, a second inlet valve 124, and a third check valve 126. The regulator valve 116 is made of a normally open type solenoid valve disposed between the input port 26a and the first common hydraulic pressure passage 112. The first check valve 118 is disposed in parallel with the regulator valve 116, and allows the brake fluid to flow from the input port 26a side to the first common hydraulic pressure passage 112 side (prevents the brake fluid from flowing to the input port 26a side from the first common hydraulic pressure passage 112 side). The first inlet valve 120 is made of a normally open type solenoid valve disposed between the first common hydraulic pressure passage 112 and the first output port 28a. The second check valve 122 is disposed in parallel with the first inlet valve 120, and allows the brake fluid to flow from the first output port 28a side to the first common hydraulic pressure passage 112 side (prevents the brake fluid from flowing to the first output port 28a side from the first common hydraulic pressure passage 112 side). The second inlet valve 124 is made of a normally open type solenoid valve disposed between the first common hydraulic pressure passage 112 and the second output port 28b. The third check valve 126 is disposed in parallel with the second inlet valve 124, and allows the brake fluid to flow from the second output port 28b side to the first common hydraulic pressure passage 112 side (prevents the brake fluid from flowing to the second output port 28b side from the first common hydraulic pressure passage 112 side).

Further, the vehicle behavior stabilization device 18 includes a first outlet valve 128, a second outlet valve 130, a reservoir 132, a fourth check valve 134, a pump 136, an intake valve 138, a discharge valve 140, a motor M, and a suction valve 142. The first outlet valve 128 is made of a normally closed type solenoid valve disposed between the first output port 28a and the second common hydraulic pressure passage 114. The second outlet valve 130 is made of a normally closed type solenoid valve disposed between the second output port 28b and the second common hydraulic pressure passage 114. The reservoir 132 is connected to the second common hydraulic pressure passage 114. The fourth check valve 134 is disposed between the first common hydraulic pressure passage 112 and the second common hydraulic pressure passage 114, and allows the brake fluid to flow from the second common hydraulic pressure passage 114 side to the first common hydraulic pressure passage 112 side (prevents the brake fluid from flowing to the second common hydraulic pressure passage 114 side from the first common hydraulic pressure passage 112 side). The pump 136 is disposed between the fourth check valve 134 and the first common hydraulic pressure passage 112, and supplies the brake fluid to the first common hydraulic pressure passage 112 side from the second common hydraulic pressure passage 114 side. The intake valve 138 and the discharge valve 140 are respectively disposed before and after the pump 136 which is driven by the motor M. The suction valve 142 is made of a normally closed type solenoid valve disposed between the second common hydraulic pressure passage 114 and the input port 26a. Note that, in the second brake system 110a, on a hydraulic pressure passage in close proximity to the input port 26a, a pressure sensor Ph is provided. The pressure sensor Ph detects the brake hydraulic pressure which is generated in the second hydraulic pressure chamber 98a of the motor cylinder device 16 and outputted through the output port 24a of the motor cylinder device 16.

Next, the operation of the vehicle brake system 10 will be described. When the vehicle brake system 10 works properly, the first shutoff valve 60b and the second shutoff valve 60a, which are made of normally open type solenoid valves, are in a closed valve state by energization, and the third shutoff valve 62 made of a normally closed type solenoid valve is in an open valve state by energization (see FIG. 1). Therefore, since the second hydraulic system 70a and the first hydraulic system 70b are shut off by the second shutoff valve 60a and the first shutoff valve 60b, the brake hydraulic pressure generated in the master cylinder 34 of the input device 14 is not transmitted to the wheel cylinders 32FR, 32RL, 32RR, 32FL of the disc brake mechanisms 30a to 30d.

In this case, the brake hydraulic pressure generated in the first pressure chamber 56b of the master cylinder 34 is transmitted to the hydraulic pressure chamber 65 of the stroke simulator 64 via the branch hydraulic path 58c and the third shutoff valve 62 in the open valve state. By the brake hydraulic pressure supplied to the hydraulic pressure chamber 65, the simulator piston 68 is displaced against spring forces of the first and second return springs 66a, 66b, and thus a stroke of the brake pedal 12 is allowed while a pseudo-pedal reaction force is generated to be applied to the brake pedal 12.

In such a system state, when the depression of the brake pedal 12 by the driver is detected by a brake pedal sensor (not shown), the electric motor 72 of the motor cylinder device 16 is driven, so that the driving force of the motor 72 is transmitted via the driving force transmission mechanism 74, and the second slave piston 88a and the first slave piston 88b are displaced in the direction of the arrow X1 in FIG. 1 against spring forces of the second return spring 96a and the first return spring 96b. By the displacements of the second slave piston 88a and the first slave piston 88b, the brake hydraulic pressures in the second hydraulic chamber 98a and the first hydraulic chamber 98b are pressurized so as to be balanced with each other, and thus a target brake hydraulic pressure is generated.

The brake hydraulic pressure in the second hydraulic chamber 98a and the first hydraulic chamber 98b of the motor cylinder device 16 is transmitted to the wheel cylinders 32FR, 32RL, 32RR, 32FL of the disc brake mechanisms 30a to 30d via the first and second inlet valves 120, 124 in the open valve state of the vehicle behavior stabilization device 18, and the friction braking forces required for each of the wheels (not shown) are given by the operations of the wheel cylinders 32FR, 32RL, 32RR, 32FL.

In other words, in the vehicle brake system 10, in a normal state where the motor cylinder device 16 for functioning as an electric brake device and a control device for performing by-wire control are operable, the brake system of so-called brake-by-wire type is active. The brake system of brake-by-wire type actuates the disc brake mechanisms 30a to 30d by the brake hydraulic pressure generated by the motor cylinder device 16, in a state where a connection between the master cylinder 34 for generating the brake hydraulic pressure by the depression of the brake pedal 12 by the driver and the disc brake mechanisms 30a to 30d (wheel cylinders 32FR, 32RL, 32RR, 32FL) for braking each of the wheels is shut off by the second shutoff valve 60a and the first shutoff valve 60b.

Figure 2:
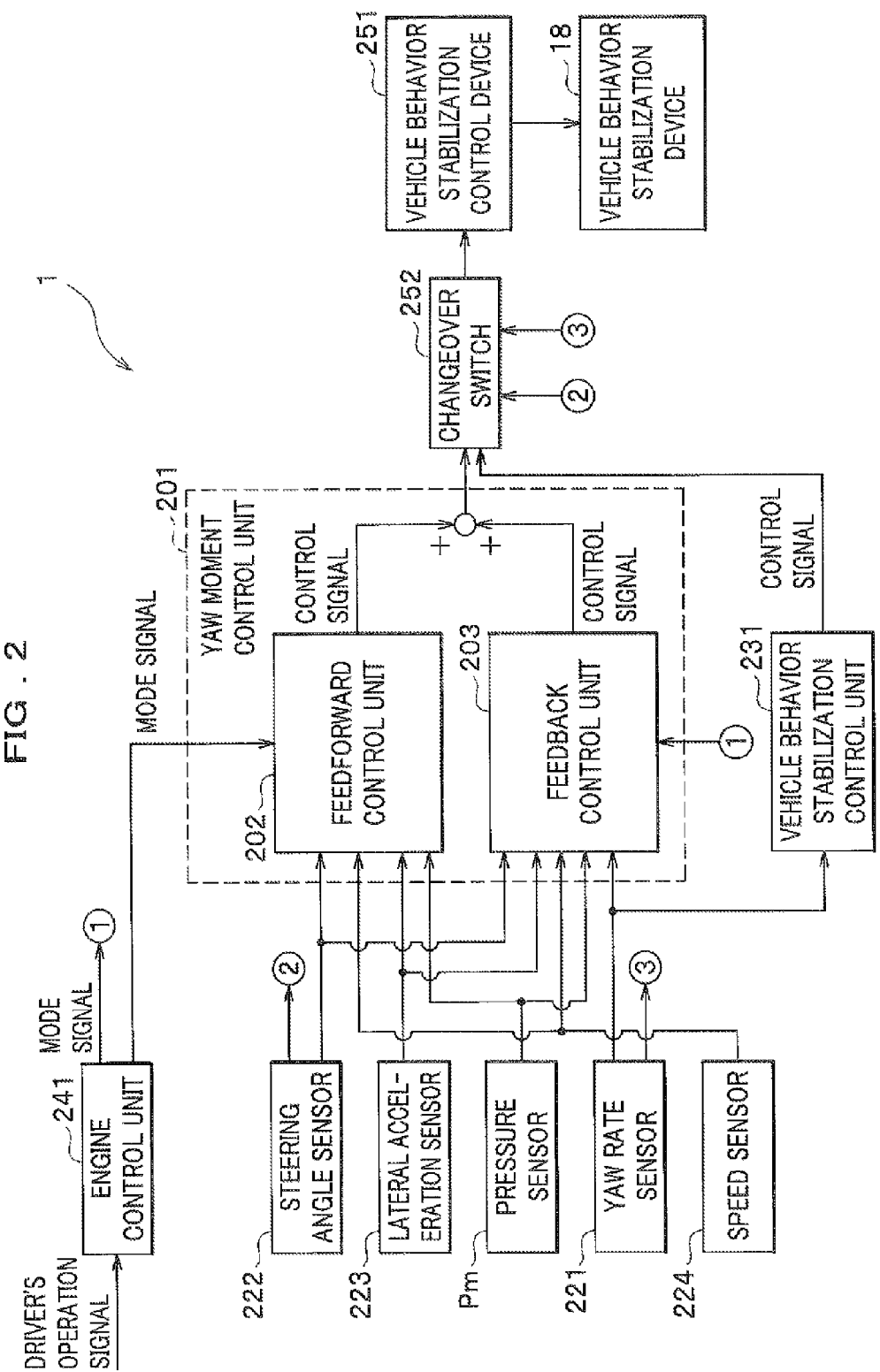
FIG. 2 is a block diagram showing electrical connections of a vehicle turning control system according to the embodiment of the present invention.

Next, control of the vehicle behavior stabilization device 18 will be described. FIG. 2 is a block diagram showing electrical connections of a vehicle turning control system 1 according to the embodiment of the present invention. The vehicle turning control system 1 includes a yaw moment control unit 201 for realizing yaw moment control of the vehicle by controlling the vehicle behavior stabilization device 18, a vehicle behavior stabilization control unit 231 for realizing control of stabilizing vehicle behavior (vehicle behavior stabilization control) by controlling the vehicle behavior stabilization device 18, and an engine (a power plant) control unit 241 for controlling an engine (a power plant) which is not shown. Note that, the following will be described on a premise that the power plant is an engine by assuming a normal gasoline vehicle or a diesel vehicle. However, in a case of a vehicle including a motor as the power plant like an electric vehicle, a hybrid vehicle, or the like, the engine described below shall be read as the motor or a combination use of the engine and the motor. Any of the yaw moment control unit 201, the vehicle behavior stabilization control unit 231, and the engine control unit 241 is a control device which is mainly composed of a microcomputer.

First, the vehicle behavior stabilization control unit 231 outputs a control signal to a vehicle behavior stabilization control device 251 (via a changeover switch 252) based on various predetermined physical quantities detected by various predetermined sensors, such as a yaw rate of the vehicle detected by a yaw rate sensor 221 for detecting the yaw rate of the vehicle. By the control signal, the vehicle behavior stabilization control device 251 controls (the above-described various actuators such as the motor M for driving the pump 136 of) the vehicle behavior stabilization device 18. A control performed by the vehicle behavior stabilization control unit 231 includes, in particular, a feedback control in which an actual yaw rate of the vehicle detected by the yaw rate sensor 221 is, for example, controlled to approach a target yaw rate.

By this control, the vehicle behavior stabilization control unit 231 individually applies the braking force to each of the four wheels of the vehicle, and performs, for example, vehicle behavior control against skidding or the like during running of the vehicle. That is, it is a control for situations such as skidding of the rear portion of the vehicle caused by rapid steering during running of the vehicle. The vehicle behavior stabilization control unit 231 can determine such situations, in which the vehicle behavior is unstable, on the basis of the above-described detected physical quantities such as the yaw rate of the vehicle detected by the yaw rate sensor 221 (Since the vehicle behavior stabilization control is well known, the detailed description thereof will be omitted).

The engine control unit 241 (switching unit) for controlling the engine (not shown) performs switching of, for example, three running modes regarding operation of the engine on the basis of a "driver's operation signal" by the driver's operation of a select lever, a steering switch, a paddle, or the like. That is, the engine control unit 241 switches the running mode to any of a first mode, a second mode, and a third mode, in response to the driver's operation. These modes are different from one another in output characteristics of the engine. That is, under the same condition of an accelerator opening degree or the like, the engine is driven at a standard revolution speed in the third mode, while the engine is driven at a higher revolution speed than the third mode in the second mode, and the engine is driven at a higher revolution speed than the second mode in the first mode.

Note that, in addition to a difference among the first mode, the second mode, and the third mode, in which the output characteristics of the engine is different from one another, a steering reaction force applied to a steering wheel may be increased, or an assist force applied to the steering wheel may be decreased in the order of the first mode, the second mode, the third mode. Or, a damping force of a damper of the vehicle may be increased in the order of the first mode, the second mode, the third mode.

The yaw moment control unit 201 includes a feedforward control unit 202 and a feedback control unit 203. To the feedforward control unit 202, information of various physical quantities detected by various sensors, such as a steering speed and a steering angle (steering amount) of the vehicle detected by a steering angle sensor 222, a lateral acceleration (lateral G) of the vehicle detected by a lateral acceleration sensor 223, a fluid pressure (hydraulic pressure) in the master cylinder 34 detected by the pressure sensor Pm, and a vehicle speed detected by a speed sensor 224, is inputted. The feedforward control unit 202 performs yaw moment control of the vehicle by feedforward control based on these physical quantities.

To the feedback control unit 203, information of the various physical quantities detected by the various sensors, such as the steering speed and the steering angle (steering amount) of the vehicle detected by the steering angle sensor 222, the lateral acceleration (lateral G) of the vehicle detected by the lateral acceleration sensor 223, the fluid pressure (hydraulic pressure) in the master cylinder 34 detected by the pressure sensor Pm, the vehicle speed detected by the speed sensor 224, and the yaw rate of the vehicle detected by the yaw rate sensor 221, is inputted. The feedback control unit 203 performs yaw moment control of the vehicle by feedback control based on these physical quantities.

Note that, control signals which are outputted from the feedforward control unit 202 and the feedback control unit 203 are summed, to be supplied to the vehicle behavior stabilization control device 251 (via the changeover switch 252). Then, the vehicle behavior stabilization control device 251 controls (the above-described various actuators such as the motor M for driving the pump 136 of) the vehicle behavior stabilization device 18.

The engine control unit 241 outputs a mode signal, which indicates any one of the first mode, the second mode, and the third mode among the running modes, to the feedforward control unit 202 and the feedback control unit 203. The changeover switch 252 selectively outputs a control signal from the yaw moment control unit 201 or the vehicle behavior stabilization control unit 231 to the vehicle behavior stabilization control device 251 based on the steering speed detected by the steering angle sensor 222, the yaw rate detected by the yaw rate sensor 221, or the like.

Figure 3:
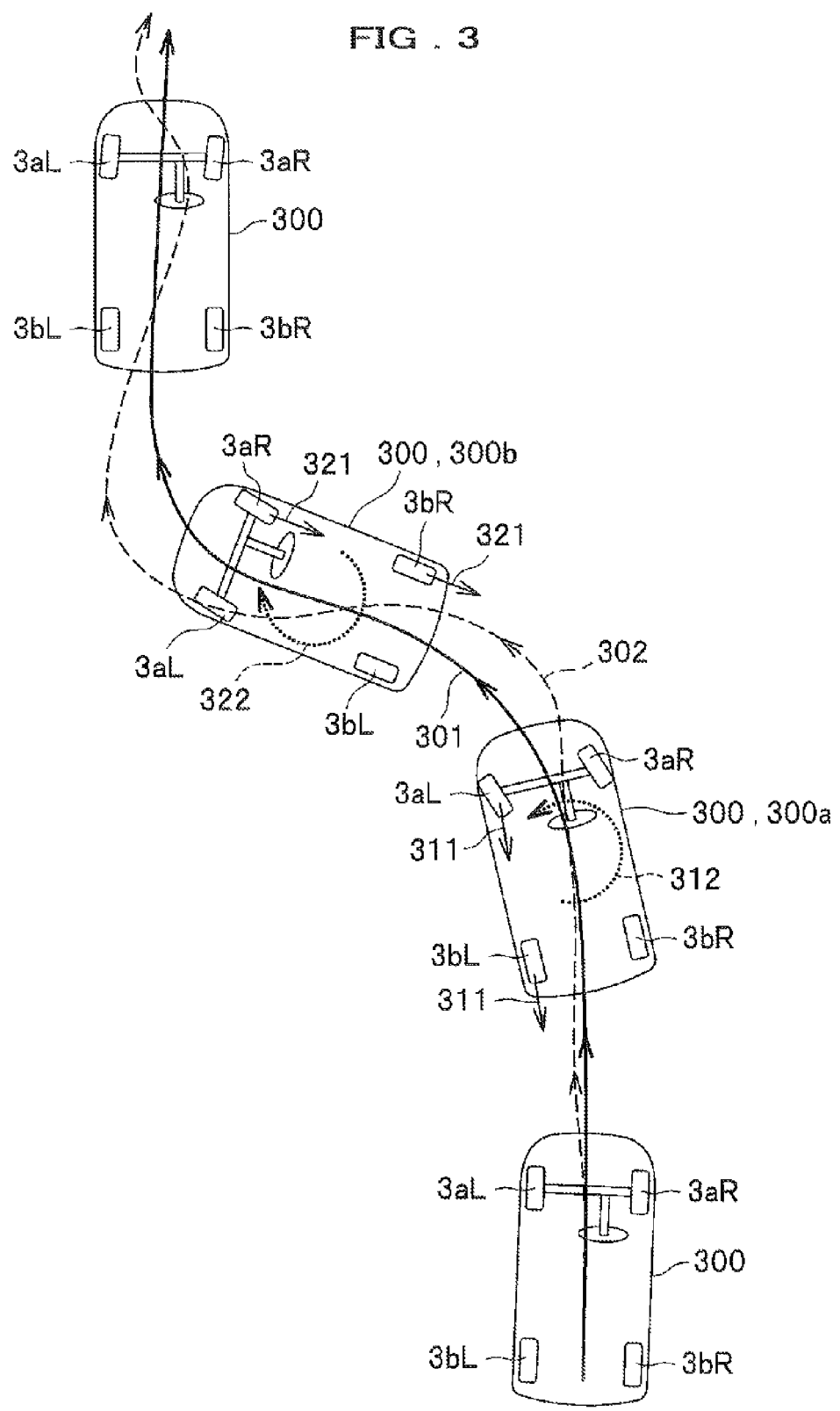
FIG. 3 is an explanatory diagram for explaining contents of control performed by a yaw moment control unit of the vehicle turning control system according to the embodiment of the present invention.

FIG. 3 is an explanatory diagram for explaining contents of control performed by the yaw moment control unit 201. FIG. 3 shows a running track line of the vehicle 300 provided with the vehicle turning control system 1 and the vehicle brake system 10. A reference numeral 301 indicates a running line which is targeted by the driver in the vehicle 300. This example shows a case in which the vehicle 300 is about to perform cornering. A reference numeral 302 indicates a running line of the vehicle 300 in a case where the yaw moment control by the yaw moment control unit 201 is not performed.

That is, when the vehicle 300 (300a) turns to the left, upon additionally turning the steering wheel to the left, small braking forces (shown by arrows 311) are applied to the front left wheel 3aL and the rear left wheel 3bL according to control of the vehicle behavior stabilization device 18 by the yaw moment control unit 201. This makes it possible to apply a turning force (yaw moment) to the vehicle 300 as shown by an arrow 312, thereby running on the target running line 301 instead of the running line 302. Note that, a start of the control by the yaw moment control unit 201 does not necessarily assume the depression of the brake pedal 12 by the driver.

Further, when the vehicle 300 (300b) turns to the right, upon turning back the steering wheel to the right, small braking forces (shown by arrows 321) are applied to the front right wheel 3aR and the rear right wheel 3bR according to control of the vehicle behavior stabilization device 18 by the yaw moment control unit 201. This makes it possible to apply a turning force (yaw moment) to the vehicle 300 as shown by an arrow 322, thereby running on the target running line 301 instead of the running line 302. By such a yaw moment control, the driver can realize a smooth vehicle behavior by a small operation of the steering wheel.

Figure 4:
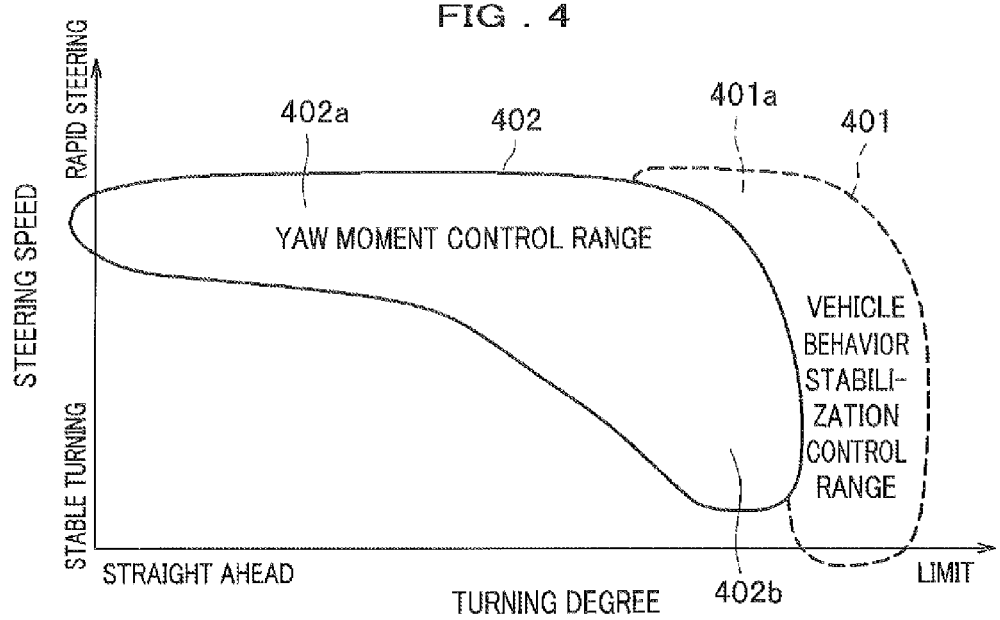
FIG. 4 is a graph for explaining operation ranges of a vehicle behavior stabilization control and a yaw moment control in accordance with a steering speed and a turning degree of a vehicle in the vehicle turning control system according to the embodiment of the present invention.

Next, a relationship between the yaw moment control by the yaw moment control unit 201 and the vehicle behavior stabilization control by the vehicle behavior stabilization control unit 231 will be described. FIG. 4 is a graph for explaining operation ranges of the vehicle behavior stabilization control and the yaw moment control in accordance with the steering speed and a turning degree of the vehicle. The horizontal axis in FIG. 4 represents the "turning degree (degree of turning speed)" (detected by the yaw rate sensor 221 or the like). That is, the "turning degree" of the vehicle is increased as it goes to the right from a "straight ahead" state of the vehicle on the most left side, and the most right side is a "limit (limit where the wheels are locked at the turning speed of the vehicle more than this)" state of the vehicle. Further, the vertical axis represents the "steering speed" of the vehicle (detected by the steering angle sensor 222 or the like). That is, the steering speed of the vehicle is increased as it goes up from a "stable turning" state of the vehicle on the lowest side, and the most upper side shows a case of "rapid steering".

In FIG. 4, a reference numeral 401 is a vehicle behavior stabilization control range where the vehicle behavior stabilization control is performed by the vehicle behavior stabilization control unit 201, and a reference numeral 402 is a yaw moment control range where the yaw moment control is performed by the yaw moment control unit 201. In this manner, since the vehicle behavior stabilization control and the yaw moment control are performed in different ranges from each other, as described above, it is determined whether it is the vehicle behavior stabilization control range 401 or the yaw moment control range 402 based on values detected by the yaw rate sensor 221, the steering sensor 222, or the like, so that the changeover switch 252 selectively outputs the control signal from the yaw moment control unit 201 or the vehicle behavior stabilization control unit 231 to the vehicle behavior stabilization control device 251 as shown in FIG. 2.

As shown in FIG. 4, it is the yaw moment control range 402 from the "straight ahead" state up to a range where the turning degree of the vehicle is increased to some extent. However, it is a case where the steering speed is the "rapid steering" (range 402a). In this case, the feedforward control unit 202 performs the yaw moment control. Then, when the turning degree approaches the "limit", it is the yaw moment control range 402 (range 402b) even in a case where the steering speed is the "stable turning". In this case, the feedback control unit 203 performs the yaw moment control. Further, when the turning degree of the vehicle is immediately before the "limit", it is the vehicle behavior stabilization control range 401 regardless of the magnitude of the steering speed. Further, when a turning degree of the vehicle is somewhat smaller than the turning degree immediately before the "limit", it is the vehicle behavior stabilization control range 401 (range 401a) in a case where the steering speed is the "rapid steering".

As described above, when the turning degree of the vehicle approaches the "limit", it is the vehicle behavior stabilization control range 401, however, before the turning degree approaches the "limit", it is the yaw moment control range 402. In other words, as the turning degree of the vehicle is increased, it is the yaw moment control range 402 at first, and then it is the vehicle behavior stabilization control range 401 when the turning degree is immediately before the "limit". As a result, by the yaw moment control according to the feedforward control, it is possible to reduce a phase delay of the steering when the turning degree of the vehicle is relatively small (range 402a). Further, by the yaw moment control according to the feedback control, it is possible to reduce the phase delay of the steering when the turning degree of the vehicle is close to the "limit" (range 402b).

Figure 5:
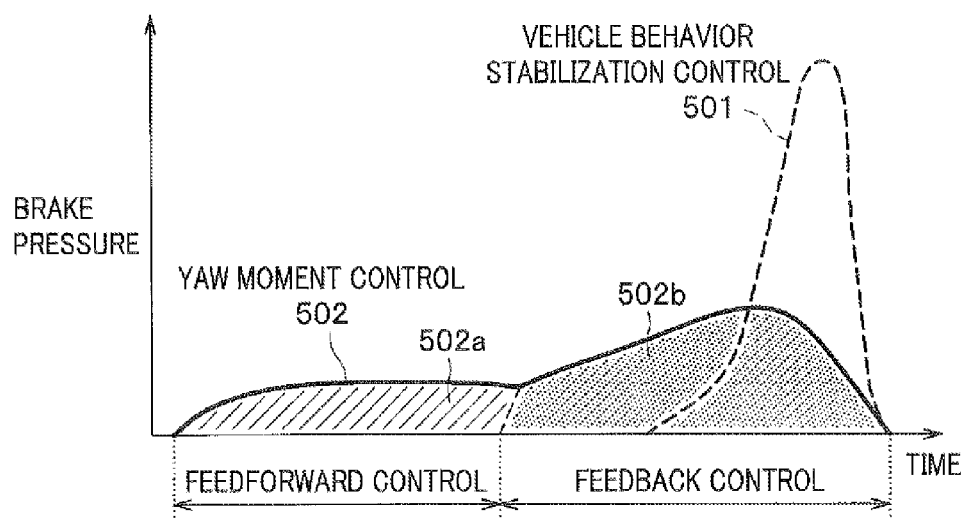
FIG. 5 is a graph for explaining operation timings of the vehicle behavior stabilization control and the yaw moment control by the vehicle turning control system according to the embodiment of the present invention.

FIG. 5 is a graph for explaining operation timings of the vehicle behavior stabilization control and the yaw moment control. The horizontal axis represents time, and the vertical axis represents braking force (brake pressure) generated in the vehicle behavior stabilization device 18 by the vehicle behavior stabilization control and the yaw moment control. The time on the horizontal axis indicates an elapsed time from detection of a sign that the vehicle behavior is unstable based on the physical quantities such as the steering speed detected by the steering sensor 222 and the yaw rate detected by the yaw rate sensor 21. As can be seen from FIGS. 4 and 5, the yaw moment control starts earlier than a start of the vehicle behavior stabilization control.

As apparent from FIG. 5, a first operation upon detection of the sign that the vehicle behavior is unstable is the feedforward control (reference numeral 502a) performed by the feedforward control unit 202 in the yaw moment control (reference numeral 502). That is, since this control is the feedforward control, the brake pressure by the yaw moment control as the feedforward control rises earliest. After a certain period of time has elapsed, the yaw moment control (reference numeral 502b) by the feedback control by the feedback control unit 203 is performed. Note that, while performing the yaw moment control by the feedback control indicated by the reference numeral 502b, the yaw moment control by the feedforward control may be performed concurrently. However, the brake pressure generated by the yaw moment control is relatively small in the case of the feedforward control as well as in the case of the feedback control.

In contrast, the vehicle behavior stabilization control (reference numeral 501) performed by the vehicle behavior stabilization control unit 231 generates a brake pressure greater than the brake pressure generated by the yaw moment control. However, a rising timing of the brake pressure by the vehicle behavior stabilization control is later than that of the yaw moment control by the feedback control and the feedforward control.

As described above, since the vehicle has a plurality of running modes to be switched by the engine control unit 241, it is considered that the contents of the vehicle behavior stabilization control performed by the vehicle behavior stabilization control unit 231 is changed in accordance with a concept of each running mode of the first mode, the second mode, and the third mode. However, when the braking force is varied by the vehicle behavior stabilization control in this way (in particular when stabilization of the vehicle behavior is reduced), there is a possibility that stability of the vehicle is impaired.

Therefore, in the present embodiment, by performing the following control by the yaw moment control unit 201, the stability of the vehicle can be maintained. That is, as described above, from the feedforward control unit 202, the feedback control unit 203, and the vehicle behavior stabilization control unit 231, the control signals are outputted to the vehicle behavior stabilization control device 251. Since the yaw moment control and the vehicle behavior stabilization control are for individually controlling the friction braking forces for the four wheels of the vehicle, each control signal includes a control signal for specifying a wheel for which the braking force is generated by each of these controls (a signal for indicating which valves of the vehicle behavior stabilization device 18 shown in FIG. 1 are closed or opened). Further, the control signals from the feedforward control unit 202, the feedback control unit 203, and the vehicle behavior stabilization control unit 231 include a control gain for controlling the braking force for the wheel to be braked. In the present embodiment, the control gain is controlled as follows in accordance with the running mode.

Figure 6:
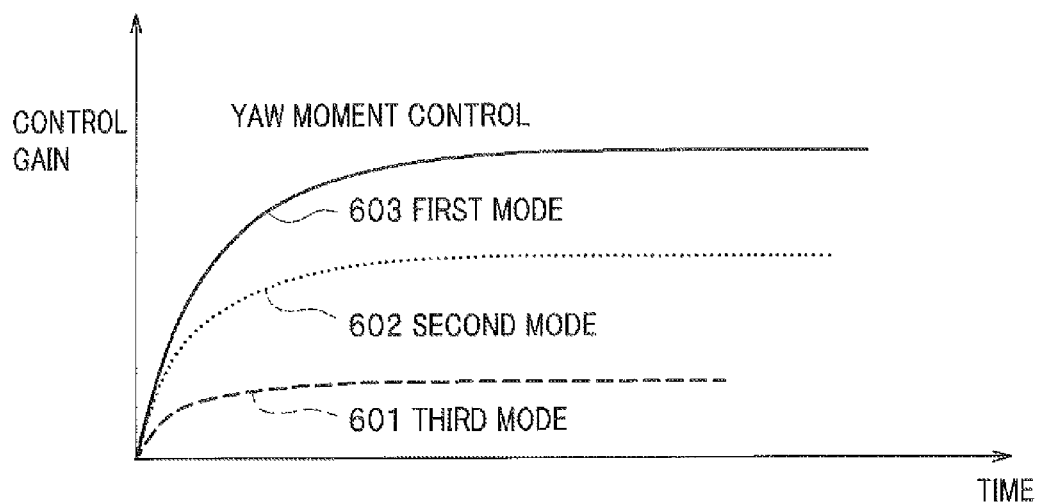
FIG. 6 is a graph showing a time variation of control gain which is outputted by a feedforward control unit of the vehicle turning control system according to the embodiment of the present invention.

That is, FIG. 6 is a graph showing a time variation of control gain which is outputted by the feedforward control unit 202. The feedforward control unit 202 changes the control gain in accordance with the mode signal from the engine control unit 241, even in a case where the various physical quantities detected by the various sensors (detected vehicle conditions) are the same with one another. That is, each control gain (each of reference numerals 601, 602, 603) is controlled so as to increase in the order of the third mode, the second mode, and the first mode, in which the output characteristics of the engine increases (the number of revolutions increases) stepwise.

Figure 7:
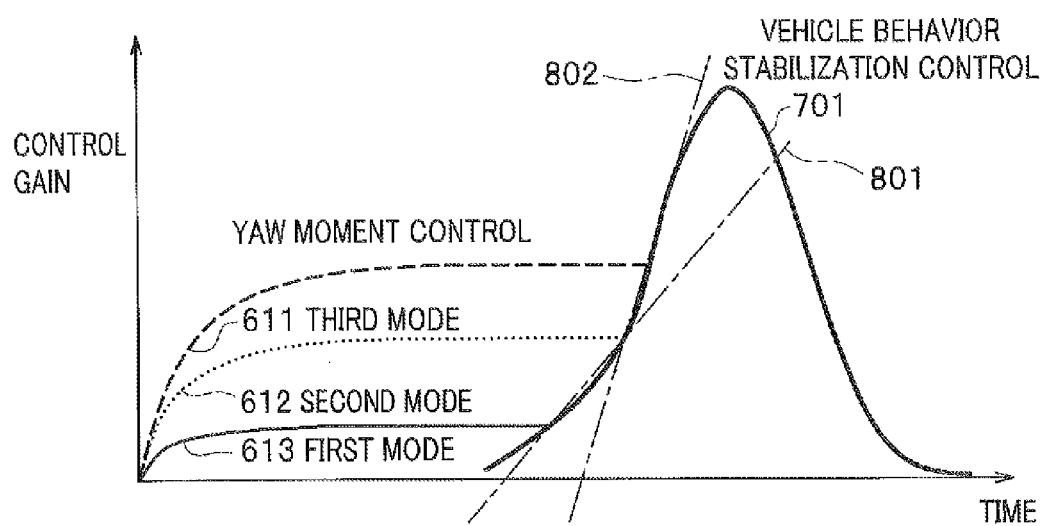
FIG. 7 is a graph showing a time variation of control gain which is outputted by a vehicle behavior stabilization control unit and a feedback control unit of the vehicle turning control system according to the embodiment of the present invention.

Further, FIG. 7 is a graph showing a time variation of control gain which is outputted by the vehicle behavior stabilization control unit 231 and the feedback control unit 203. The feedback control unit 203 changes the control gain in accordance with the mode signal from the engine control unit 241, even in the case where the various physical quantities detected by the various sensors (detected vehicle conditions) are the same with one another. That is, each control gain (each of reference numerals 611, 612, 613) is controlled so as to decrease in the order of the third mode, the second mode, and the first mode, in which the output characteristics of the engine increases (the number of revolutions increases) stepwise.

As described above, in the running mode in which the output characteristics of the engine is higher, it is controlled such that the control gain of the feedforward control is larger and the control gain of the feedback control is smaller. In FIG. 7, a control gain 701 of the vehicle behavior stabilization control, which follows the control gains 611, 612, 613 of the third mode, the second mode, the first mode, shows a common time variation regardless of the running modes of the third mode, the second mode, and the first mode.

Further, in FIG. 7, variation curves of the control gains 611, 612, 613 of the yaw moment control are connected to a variation curve of the control gain 701 of the vehicle behavior stabilization control. This means that each variation of the control gain 701 by the vehicle behavior stabilization control starts from each of start points which are connection points of the control gains 611, 612, 613 with the control gain 701.

In this case, a reference numeral 801 indicates a slope of variation of the control gain 701 between a time of transition to the vehicle behavior stabilization control from the feedback control by the yaw moment control in the first mode and a time of transition to the vehicle behavior stabilization control from the feedback control by the yaw moment control in the second mode. Further, a reference numeral 802 indicates a slope of variation of the control gain 701 between the time of transition to the vehicle behavior stabilization control from the feedback control by the yaw moment control in the second mode and a time of transition to the vehicle behavior stabilization control from the feedback control by the yaw moment control in the third mode. The slope 801 is more gradual than the slope 802. That is, the variation of the control gain 701 is more gradual in the slope 801 than in the slope 802.

Next, an operation of the vehicle turning control system 1 will be described. According to the vehicle turning control system 1 described above, the control gain of the yaw moment control is varied in accordance with the running mode. That is, the control for changing the control gain in accordance with the running mode is not the vehicle behavior stabilization control which operates in the range close to the "limit" of the turning degree of the vehicle and generates a large braking force, but the yaw moment control which generates a small braking force before operation of the vehicle behavior stabilization control (see FIGS. 4 to 7). Therefore, the stability of the vehicle can be maintained even in a case of changing the control gain.

In this case, in the running mode in which the output characteristics of the engine is higher, it is controlled such that the control gain of the feedforward control is larger and the control gain of the feedback control is smaller in the yaw moment control (see FIGS. 6 and 7). Therefore, in a case where the output characteristics of the engine is increased by the driver's intention, it is possible to travel with an emphasis on vehicle controllability by the driver.

Further, the slope 801 is more gradual than the slope 802. That is, in a case of the first mode of traveling with the emphasis on vehicle controllability by the driver, a rise of the braking force of the vehicle behavior stabilization control starts gradually even when the control is shifted to the vehicle behavior stabilization control. On the other hand, in a case of the second mode (further, the third mode) that does not place an emphasis on vehicle controllability by the driver as much as the first mode, the rise of the braking force of the vehicle behavior stabilization control is steep when the control is shifted to the vehicle behavior stabilization control. That is, when traveling with the emphasis on vehicle controllability by the driver, since a forced operation of the braking force by the vehicle behavior stabilization control starts slowly, an uncomfortable feeling is not given to the driver.

Note that, the yaw moment control unit 201 includes the feedforward control unit 202 and the feedback control unit 203, and the yaw moment control is performed by both of the feedforward control and the feedback control, however, the yaw moment control may be performed by either the feedforward control or the feedback control. Further, in the above example, it is controlled such that the control gain outputted by the feedforward control unit 202 is increased in the running mode in which the number of revolutions of the engine is higher, and the control gain outputted by the feedback control unit 203 is decreased in the running mode in which the number of revolutions of the engine is higher. As a result, it is possible to travel with the emphasis on vehicle controllability by the driver. However, the present invention is not limited thereto, it may be controlled such that the control gain outputted by the feedforward control unit 202 is decreased in the running mode in which the number of revolutions of the engine is higher, and the control gain outputted by the feedback control unit 203 is increased in the running mode in which the number of revolutions of the engine is higher.

REFERENCE SIGNS LIST

1: vehicle turning control system
201: yaw moment control unit
202: feedforward control unit
203: feedback control unit
231: vehicle behavior stabilization control unit
241: engine control unit (switching unit)
601, 611: third mode
602, 612: second mode
603, 613: first mode

The invention claimed is:

1. A vehicle turning control system comprising:
a yaw moment control unit, including at least one of a feedforward control unit and a feedback control unit, for performing yaw moment control of a vehicle in accordance with a steering amount of the vehicle;
a switching unit for switching output characteristics of a power plant for the vehicle to any one of a plurality of modes by a driver's operation, and
a vehicle behavior stabilization control unit for performing a vehicle behavior stabilization control, wherein:
the yaw moment control unit is configured to change a control gain of the yaw moment control in accordance with a currently selected mode; and
the vehicle behavior stabilization control unit is configured to set a common control gain of the behavior stabilization control unit regardless of the mode.

2. The vehicle turning control system according to claim 1,
wherein the yaw moment control unit includes said feedforward control unit for performing yaw moment control of the vehicle by a feedforward control in accordance with the steering amount of the vehicle, and
wherein the feedforward control unit is configured to increase a control gain of the feedforward control in a mode where the output characteristics of the power plant are higher than that of other modes among the plurality of modes.

3. The vehicle turning control system according to claim 1,
wherein the yaw moment control unit includes said feedback control unit for performing yaw moment control of the vehicle by a feedback control in accordance with the steering amount of the vehicle, and
wherein the feedback control unit is configured to decrease a control gain of the feedback control in a mode where the output characteristics of the power plant are higher than that of other modes among the plurality of modes.

4. The vehicle turning control system according to claim 2,
wherein the switching unit includes, as the plurality of modes, a first mode, a second mode, and a third mode, in which the output characteristics of the power plant for the vehicle are increased in this order, and
wherein the feedforward control unit is configured to increase the control gain in the order of the first mode, the second mode, and the third mode.

5. The vehicle turning control system according to claim 3,
wherein the switching unit includes, as the plurality of modes, a first mode, a second mode, and a third mode, in which the output characteristics of the power plant for the vehicle are increased in this order, and
wherein the feedback control unit is configured to decrease the control gain in the order of the first mode, the second mode, and the third mode.

6. The vehicle turning control system according to claim 2, wherein the vehicle behavior stabilization control unit performs the behavior stabilization control based on a difference between an actual yaw rate of the vehicle and a target yaw rate of the vehicle after the feedforward control.

7. The vehicle turning control system according to claim 3, wherein the vehicle behavior stabilization control unit performs the behavior stabilization control based on a difference between an actual yaw rate of the vehicle and a target yaw rate of the vehicle after the feedback control.

8. The vehicle turning control system according to claim 3, wherein during operation of the vehicle behavior stabilization control unit, a change of control gain of the vehicle behavior stabilization control,
between a time of transition to the vehicle behavior stabilization control from the yaw moment control by the feedback control of a first mode, and a time of transition to the vehicle behavior stabilization control from the yaw moment control by the feedback control of a second mode,
is slower than a change of control gain of the vehicle behavior stabilization control between a time of transition to the vehicle behavior stabilization control from the yaw moment control by the feedback control of the second mode and a time of transition to the vehicle behavior stabilization control from the yaw moment control by the feedback control of a third mode.

9. The vehicle turning control system according to claim 2, wherein a braking force by the feedforward control unit is smaller than a braking force by the vehicle behavior stabilization control unit.

10. The vehicle turning control system according to claim 3, wherein a braking force by the feedback control unit is smaller than a braking force by the vehicle behavior stabilization control unit.

11. A vehicle turning control system comprising:
a yaw moment control unit, including at least one of a feedforward control unit and a feedback control unit, for performing yaw moment control of a vehicle in accordance with a steering amount of the vehicle;
a switching unit for switching output characteristics of a power plant for the vehicle to any one of a plurality of modes by a driver's operation, and
a vehicle behavior stabilization control unit for performing a vehicle behavior stabilization control,
wherein:
the yaw moment control unit is configured to change a control gain of the yaw moment control in accordance with a currently selected mode;
the vehicle behavior stabilization control unit is configured to set a common control gain of the vehicle behavior stabilization control unit regardless of the mode;
the feedforward control unit for performs yaw moment control of the vehicle by a feedforward control in accordance with the steering amount of the vehicle;
the feedforward control unit is configured to increase a control gain of the feedforward control in a mode where the output characteristics of the power plant are higher than that of other modes among the plurality of modes;
the feedback control unit for performs yaw moment control of the vehicle by a feedback control in accordance with the steering amount of the vehicle; and
the feedback control unit is configured to decrease a control gain of the feedback control in a mode where the output characteristics of the power plant are higher than that of other modes among the plurality of modes.

12. The vehicle turning control system according to claim 11, wherein during operation of the vehicle behavior stabilization control unit, a change of control gain of the vehicle behavior stabilization control,
between a time of transition to the vehicle behavior stabilization control from the yaw moment control by the feedback control of a first mode, and a time of transition to the vehicle behavior stabilization control from the yaw moment control by the feedback control of a second mode,
is slower than a change of control gain of the vehicle behavior stabilization control between a time of transition to the vehicle behavior stabilization control from the yaw moment control by the feedback control of the second mode and a time of transition to the vehicle behavior stabilization control from the yaw moment control by the feedback control of a third mode.

13. The vehicle turning control system according to claim 11, wherein
the vehicle behavior stabilization control unit for performing a control to stabilize the vehicle behavior based on a difference between an actual yaw rate of the vehicle and a target yaw rate of the vehicle after at least of one of the feedforward control and the feedback control.

14. The vehicle turning control system according to claim 13, further comprising
a changeover switch selectively outputting a control signal from one of the yaw moment control unit and the vehicle behavior stabilization control unit to a vehicle behavior stabilization control device.

15. The vehicle turning control system according to claim 13, wherein a braking force by the feedforward control unit is smaller than a braking force generated by the vehicle behavior stabilization control unit.

16. The vehicle turning control system according to claim 13, wherein a braking force by the feedback control unit is smaller than a braking force generated by the vehicle behavior stabilization control unit.

17. The vehicle turning control system according to claim 13, wherein the output characteristics of the power plant for the vehicle are revolutions of a vehicle engine.

* * * * *